3,708,421
PROCESS TO REMOVE MERCAPTAN SULFUR
FROM SOUR OILS
Charles W. Rippie, 1731 S. Cheyenne,
Tulsa, Okla. 74019
Filed Sept. 20, 1971, Ser. No. 181,946
Int. Cl. C10g 29/22
U.S. Cl. 208—244 R                     9 Claims

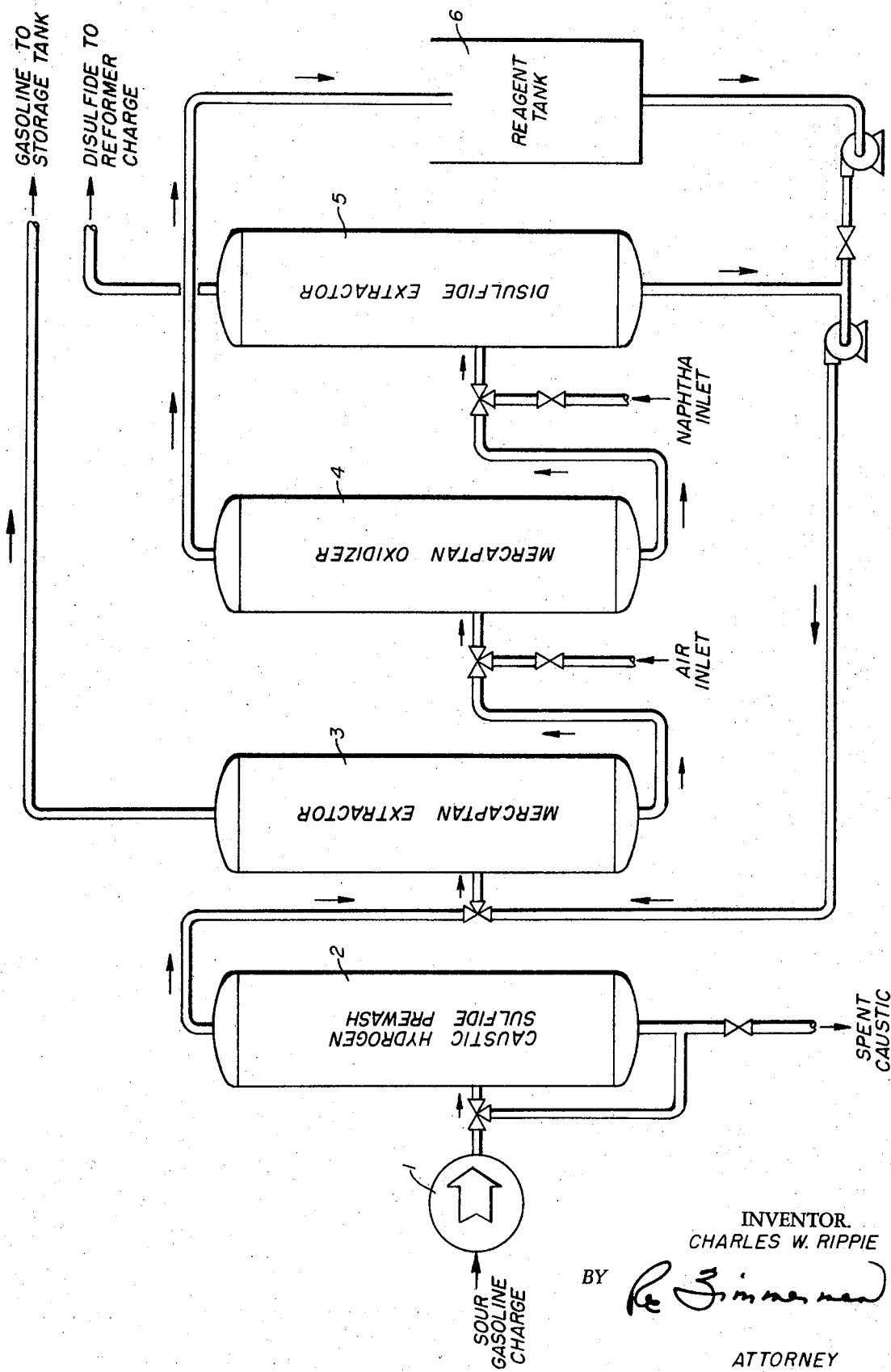

ABSTRACT OF THE DISCLOSURE

A process for the removal of mercaptan sulfur in the manufacture of petroleum products by treating sour gasolines and other petroleum distillates in the boiling range of 100 to 400 degrees Fahrenheit with a reagent formed by reacting a water soluble metal salt with a mixture of a glycinate derivative in an alkaline solution in which the said metal salt in an alkaline solution combines with mercaptan sulfur compounds in a sour gasoline and distillate stream; by prewashing the sour gasoline and distillates with a caustic-hydrogen sulfide solution; a first step of extracting the mercaptan sulfur compounds from the sour gasoline and distillates in the presence of the said alkaline reagent; a second step of oxidizing the mercaptan sulfur compounds in the spent alkaline reagent with a gas containing oxygen so as to regenerate the spent alkaline reagent for recycling for use in the said first step; and, a third step of extracting the disulfide sulfur from the regenerated reagent.

BACKGROUND OF THE INVENTION

The removal of mercaptan sulfur in the manufacture of petroleum products has been a problem for the oil industry for a considerable length of time. Various methods to remove mercaptan sulfur have been proposed; however, a number of the methods of mercaptan removal changes the mercaptans to oil soluble disulfide sulfur compounds that remain in the treated oils. Hence, the treated oil still contains sulfur compounds.

High concentrations of caustic soda solutions are now used to treat sour gasolines which have the disadvantages of reacting with phenols and similar products to form soaps that emulsify the gasoline in the caustic soda solutions. The soaps formed are carried in the spent caustic soda solution to storage with subsequent discharge into water streams. This practice adds to increased pollution problems. Caustic soda solutions have limited capacity for mercaptan sulfur compounds. To improve the capacity, many additives have been promoted to improve mercaptan sulfur removal in manufacturing operations. The U.S. patent to A. P. Hewlett et al., No. 2,348,623, dated May 9, 1944, teaches a method of treating mineral oils for removal of mercaptan sulfur compounds in a sour gasoline by reacting the mercaptan sulfur in the mineral oils with sodium plumbite and an enhancing agent potassium isobutyrate. For example, using a six normal potassium hydroxide plumbite solution with a three normal potassium isobutyrate partially removes the lead mercaptides. Further processing through a filter medium is required to produce hydrocarbon oil free from mercaptides in the finished gasoline. This process without filtering has the limitation of leaving lead mercaptides in the mineral oil. A clay filtering is required to free the gasoline from mercaptan sulfur compounds.

The U.S. patent to W. K. T. Gleim et al., No. 2,853,432, dated Sept. 23, 1958, describes a method of regenerating a used alkaline solution with an oxygen containing gas such as air in the presence of a metal phthalocyanine catalyst. This method has limitation in that it does not remove any more total mercaptan and disulfide sulfur from the sour gasoline than sodium hydroxide alone. Since the metal phthalocyanine tends to decompose during the oxidation of the mercaptan sulfur compounds, its efficiency as a catalyst in oxidation is reduced.

SUMMARY OF THE INVENTION

Presently, refinery treating processes use high concentrations of caustic soda solutions to reduce or convert the mercaptan sulfur in sour gasolines to meet an odor specification. Such solutions react with organic acid compounds such as phenols to form soap-like materials that emulsify the caustic soda solution and the treated gasoline. Frequent disposal of such spent solutions pollutes the water outlets in the refining operations. This invention requires lower caustic soda concentrations, since a reagent in alkaline solution extract more mercaptan sulfur from the sour gasoline than higher concentration alkaline solution without the reagent. In addition, this invention avoids large concentrations of soaps that emulsify the gasolines in the alkaline solution. The reagent has a special property as a catalyst so as to oxidize the mercaptan sulfur compounds to disulfide sulfur compounds at a high rate of efficiency which affords regeneration of the spent treating reagent rapidly for reuse in a continuous operation. The spent caustic soda solution presently used in refineries has a very low rate of regeneration with poor overall operating results.

No treating process today is effective in solving the problem of mercaptan sulfur removal from sour gasolines and distillates. Some processes remove limited amounts of mercaptan sulfur from sour gasolines, while other processes oxidize a large percentage of the mercaptan sulfur compounds in the sour gasolines to disulfide sulfur compounds. However, most of the sulfur compounds remain in the treated gasoline. Such treated gasolines upon ignition produce increased amounts of sulfur oxide gases in automotive engines which pollute the air in the form of engine exhaust gases.

This invention, when applied in refinery processes, reduces the amount of tetraethyl lead (TEL) required in blending the gasolines. Since the reagent extracts maximum amounts of mercaptan sulfur from the sour gasoline, less tetraethyl lead is required to give the same research octane number compared to the same sour base gasoline. Shell Oil reported the "Effects of Tetraethyl Lead on Octane Numbers," in Industrial & Engineering Chemistry, vol. 25, No. 2, pages 187–191 in 1933. The presence of both mercaptan and disulfide sulfur compounds in the base gasolines increase the amount of TEL necessary in treatment to equal the same Research Octane Number (RON) of the base gasoline without these sulfur compounds. Treated gasolines requiring additional TEL increase the amount of lead particles in the automotive exhaust that pollute the air.

This new invention uses a reagent in alkaline solution to increase the mercaptan sulfur extraction from the sour gasoline. Presently, large volumes of straight run gasolines from crude oil distillation contain large amounts of mercaptan sulfur in the finished gasoline. This new reagent in an alkaline solution extracts such mercaptans from blended straight run and cracked gasolines, this decreasing the amount of TEL required to obtain the desired octane numbers.

OBJECTS OF THE INVENTION

The principal object of this invention is to disclose a new process to remove mercaptan sulfur compounds from sour gasolines.

Another object of this invention is to reduce both the amounts of sulfur gas and lead particles in engine exhaust gas, thus decreasing the air pollution in our environment.

Still another object of this invention is to improve overall treating operations, so that there will be less waste disposal of treating solutions in water outlet from the refining operations compared to the present treating processes used in the gasoline industry.

And still another object of this invention is to improve the quality of the treated gasoline to prevent excessive corrosion in automotive exhaust equipment, due to high sulfur oxide content in the exhaust gas by reducing the sulfur concentration in treated gasoline.

Ethyl Corporation reported "Road Effectiveness of Tetraethyl Lead as Influenced by Added Sulfur" to the American Petroleum Institute Division of Refining, May 4, 1950. On page eight, figure one is shown the relationship between the weight percentile of various sulfur compounds added to the base gasoline on the efficiency of tetraethyl lead (TEL). Both mercaptan sulfur and disulfide sulfur compounds reduce TEL efficiency. Figure one in the article shows that fifty parts per million of either or both combined mercaptan and disulfide increase the TEL required about 25 percent for the RON compared to the base gasoline not containing these sulphur compounds.

DISCUSSION OF INVENTION

I have now discovered that a certain class of reagent in an alkaline solution containing an iron cation and a glycinate salt of mixed chelating agents anion compounds will obtain all of the above objects of this invention. This reagent increases the extraction of mercaptan sulfur compounds with rapidity in an alkaline solution. The use of this reagent to treat the sour gasolines reduces the amount of TEL required for the same RON as the base gasoline where both mercaptan sulfur and disulfide sulfur have not been removed, or in a treated gasoline containing disulfide sulfur equivalent to the mercaptan content of the sour gasoline.

The iron glycinate reagent in an alkaline solution which I shall disclose is stable under wide operating conditions. The high rate of regeneration of the spent solutions permits use over a long time period. The stability and regenerative ability of the reagent reduces the amount of waste disposal in the refinery water outlet.

This reagent reduces air pollution by reducing the amounts of sulfur oxide gases produced in the exhaust of automotive engine using the treated gasolines. Reduced acidic sulfur oxide gases also reduces the corrosion and maintenance of automotive exhaust equipment.

This iron glycinate reagent is prepared by reacting one weight of ferric chloride $6H_2O$ and thirty weights of amino acetic acid-glycine with suitable mixed chelating agents in known volume of water; and by adding calculated amount of this reagent to known volume of caustic soda solution. Various iron-glycinate concentrations can be used for different treatments of sour gasolines to obtain the maximum mercaptan extraction. Different caustic soda concentrations can be used for maximum mercaptan sulfur extractions. For example, an average iron glycinate reagent contains 150 to 300 p.p.m. iron, and 40 to 120 g.p.l. NaOH for the treatment of 50 to 2000 p.p.m. mercaptan sulfur sour gasolines.

Table 1 which follows illustrates the test results of cracked gasolines and blended gasolines treated with and without iron glycinate in an alkaline solution. The same volume ratio of reagent to gasolines and contact time used in all tests. Total mercaptan and disulfide sulfur tests were determined by using Humble's Acid-Stirring Method, Analytical Technical Committee Report, page 164, July 1962 and ASTM D 1323-62 for Mercaptan Sulfur in Aviation Turbine Fuels.

TABLE 1

| Example No. | Iron glycinate, p.p.m. | NaOH, g.p.l. | Total RSH and $R_2S_2$ | | |
|---|---|---|---|---|---|
| | | | Sour, p.p.m. | Treated, p.p.m. | Removed, percent |
| 1. Cracked gasoline | Zero | 40 | 65 | 50 | 23.0 |
| 2. Cracked gasoline | 150 | 47 | 65 | 20 | 30.8 |
| 3. Cracked gasoline | 150 | 90 | 65 | 10 | 84.5 |
| 4. Blend 1 cracked/3SR | 750 | 130 | 80 | 10 | 87.5 |
| 5. Blend 1 cracked/3SR | Zero | 130 | 80 | 54 | 32.4 |

Example 1.—A sour cracked gasoline contained 65 p.p.m., total RSH and $R_2S_2$ before treatment and 50 p.p.m. after treatment. Both values herein referred as TS (total reactive sulfur) for total mercaptan and disulfide sulfur. The treating reagent was only caustic soda solution containing no iron glycinate. The treated gasoline tested 50 p.p.m. TS which shows that only 15 p.p.m. of sulfur or 23% was removed by this treatment. The usual testing method reports only RSH values in the treated gasolines, and does not include the disulfide sulfur in the treated gasoline. Hence no TEL reductions can be calculated.

Examples 2, 3 and 4.—These three samples, Examples 2 and 3 cracked gasoline and Example 4 a blend of cracked and straight run gasoline, show that by increasing the NaOH g.p.l. or increasing the p.p.m. of iron glycinate removes increasing amounts of TS from the sour gasoline samples.

Example 5.—This example shows a blend of sour cracked and straight run gasoline (SR) treated with 130 g.p.l. caustic soda solution where there was no iron glycinate used. The treated gasoline tested 54 p.p.m. TS, or 32.4 percent TS removed from the blended gasoline.

Table 2 shows that the addition of iron glycinate extracts increased amounts of TS as total RSH and $R_2S_2$ removal consequently increased the Research Octane Number (RON) of the treated gasoline compared to untreated sour gasoline. The equivalent TEL reduction is calculated as shown in figure four, page 104 of the "Oil and Gas Journal" dated June 10, 1970, where RON is plotted against TEL g./gallon of gasoline.

TABLE 2

| Example | Sour, p.p.m. | Treated, p.p.m. | TEL, g./gal. added | Research octane No. | | | Reduced TEL, g./gal. |
|---|---|---|---|---|---|---|---|
| | | | | Treated | Sour | Increase | |
| 1. Blend 1 cracked/3SR | 80 | 10 | 3.17 | 91.5 | 90.7 | 0.8 | 0.6 |
| 2. Blend 3 cracked/5SR | 80 | 10 | 3.17 | 92.8 | 91.9 | 0.9 | 0.6 |

Example 1.—A sour blend of one cracked and three straight run gasolines was treated with 750 p.p.m. iron glycinate in 130 g.p.l. NaOH for one minute. The sour gasoline contained 80 p.p.m. TS, and the treated gasoline blend tested 10 p.p.m. The engine tests show that treated gasoline increased RON over sour gasoline. By treating this sour gasoline blend, the TEL g./per gallon is reduced 0.6 gram/gallon and still maintain the same RON. These tests confirm that mercaptan sulfur removal increases RON, reduces TEL in the treated gasoline, and confirm Ethyl's report that fifty parts per million TS extraction from the treated gasoline reduces the TEL about twenty-five percent.

Example 2.—Another blend of three parts cracked and five parts straight run sour gasolines treated with an alkaline reagent containing 750 p.p.m. iron glycinate in 130 g.p.l. of NaOH for one minute. The sour blend contained 80 p.p.m. total sulfur while the treated blend contained 10 p.p.m. total sulfur. The engine tests with 3.17 g. TEL/gallon showed that a reduction of 70 p.p.m. total sulfur increased the RON by 0.9, which calculates to be 0.6 g. TEL per gallon less for the treated gasoline than the same sour gasoline.

Table 3 illustrates that iron glycinate in an alkaline solution increased the regeneration rate of mercaptan removal from the spent reagent compared to caustic soda solution alone. The 200 ml. samples of spent reagent were contacted with 400 ml. of air per minute for five minutes at 95 degrees Fahrenheit. The iron glycinate acts as a catalyst in the oxidation of the RSH to $R_2S_2$ in the alkaline solution. Analyses are based on Shell Method 298/51 for Mercaptan Determination in The Presence of Reducing Agents, and ASTM D-1323-62 for Mercaptan Sulfur in Aviation Turbine Fuels.

TABLE 3

| Example | Iron glycinate, p.p.m. | NAOH, mg./liter | RSH, p.p.m. Spent | RSH, p.p.m. Regenerated | Removed RSH, percent |
|---|---|---|---|---|---|
| 1. Reagent, spent | Zero | 40 | 400 | 360 | 10.0 |
| 2. Reagent, spent | 150 | 40 | 228 | 160 | 45.0 |
| 3. Reagent, spent | 150 | 40 | 400 | 192 | 50.2 |
| 4. Reagent, spent | 300 | 40 | 400 | 160 | 60.0 |

Example 1.—A refinery spent caustic soda solution tested 400 p.p.m. mercaptan sulfur, and regenerated under the above conditions. Tests showed that only 10 percent of the RSH was oxidized in five minutes.

Example 2.—Another spent caustic soda solution containing 288 p.p.m. RSH was treated with 150 p.p.m. of iron glycinate reagent. The regeneration rate showed 45 percent removal.

Example 3.—A refinery spent caustic soda solution containing 400 p.p.m. RSH treated with 150 p.p.m. iron glycinate, and regenerated under the same above conditions showed 50.2 percent regeneration.

Example 4.—This example duplicates Example 3 except 300 p.p.m. of iron glycinate added to the spent reagent tested 60.0 percent regeneration in five minutes.

As a further explanation of the process for the removal of mercaptan sulfur using the described alkaline reagent, reference is made to the flow sheet.

The hydrocarbon oil 1 is passed through a caustic soda hydrogen sulfide 2 to remove any hydrogen sulfide remaining in the hydrocarbon oil. The prewash caustic soda was prepared by using 25 grams of NaOH per liter of solution. The removal of hydrogen sulfide as such is required in my process only to prevent the precipitation of iron in the form of iron sulfide from the iron glycinate treating solution used in the removal of mercaptan sulfur. The hydrogen sulfide free hydrocarbon oil then passes to the mercaptan extractor 3 where the hydrocarbon oil is treated at ambient temperature with a dilute alkaline solution containing the iron glycinate. The mercaptan sulfur in the hydrocarbon oil reacts with iron glycinate in the treating solution to form an iron glycinate complex salt which is soluble in dilute alkaline solution. At this stage the hydrocarbon oil and the mercaptan sulfur are separated. The hydrocarbon oil (gasoline) then passes to storage. The treating solution containing the iron mercaptide glycinate then passes to the oxidizer vessel 4 where the iron mercaptide is oxidized by the air containing oxygen to regenerate the iron glycinate alkaline treating solution. The iron mercaptide glycinate in the spent alkaline solution is oxidized to disulfide sulfur compound $R_2S_2$ and regenerated iron glycinate treating solution. The regenerated treated solution and the disulfides $R_2S_2$ are then washed in the disulfide extractor 5 with naphtha to extract the disulfides $R_2S_2$. The disulfides are passed to a reformer to convert the disulfides to suitable sulfur recovery. In this scrubbing step, the treating solution and the disulfides are separated and the regenerated treating solution is recirculated back to the mercaptan extractor 3. Provision is made for the make-up from the reagent make-up tank 6. To further substantiate the use of glycinate derivatives with other metal ions, lead was reacted with a glycinate derivative in an alkaline solution to form lead diethanol glycinate. The lead diethanol glycinate reacts with mercaptan sulfur to form the chelate of lead mercapto diethanolglycinate thus extracting mercaptan sulfur from sour gasolines. In a matter similar to the method previously described, the spent solution was regenerated with an oxygen containing gas such as air to oxidize the mercaptan sulfur to disulfide sulfur compounds in tower 4 FIG. 1, the disulfuide sulfur compounds extracted in the extraction tower 5. The regenerated solution was recycled back to the mercaptan extractor 3 for use again. The disulfide sulfur compounds was removed in tower 5 from the reagent by a naphtha wash operation and disposed to recover sulfur.

Example 1.—A sour cracked gasoline containing 60 p.p.m. of mercaptan sulfur treated with the above lead chelate extracted the mercaptan sulfur to 4 p.p.m. or doctor sweet. The doctor test confirmed that the treated gasoline was doctor sweet by adding doctor solution and free sulfur with agitation in closed suitable bottle. No black color developed showing the absence of mercaptan sulfur in the treated gasoline.

Reference is made to the text on "The Chemistry of Metallic Chelate Compounds" by Martell and Calvin which states on page 339 (1952 edition) that cobalt chelate compounds are useful as a catalyst in oxidation reactions. In this invention, cobalt nitrate was reacted with diethanol glycinate to form the cobalt chelate which was found to be soluble in caustic soda solution. Further tests proved that the cobalt chelate in alkaline solution will extract mercaptan sulfur from sour hydrocarbon oils. The cobalt diethanol glycinate in an alkaline solution combines with mercaptan sulfur to form cobalt diethanol glycinate mercaptide, which can be readily separated from the hydrocarbon oils. The cobalt diethanol glycinate mercaptide in an alkaline solution was treated with an oxygen containing gas to oxidize the cobalt diethanol glycinate mercaptides to disulfur sulphur ($R_2S_2$) and cobalt diethanol glycinate. The $R_2S_2$ was separated from the cobalt diethanol glycinate with naphtha for further processing. The regenerated cobalt chelate compounds in alkaline solution was recycled to the sour oil extraction phase for reuse.

Example 1.—Following the above procedure, a cobalt chelate containing 200 p.p.m. of cobalt in an alkaline solution was used to treat sour hydrocarbon oil, the sample which contained 70 p.p.m. of mercaptan sulfur was reduced to 6 p.p.m. The separated aqueous phase which contained mercaptides was treated with air containing oxygen and shows a zero RSH.

It should also be noted that the spent or regenerated treating solution contains other organic solutizers such as sodium creyslate and sodium phenolate which have been removed in my process from the sour gasolines. These compounds tend to increase the extracting equilibrium of my treating reagent in the removal of mercaptan sulfur from the sour gasoline.

What is claimed is:

1. A process for the substantial removal of mercaptan sulfur from hydrocarbon oils by extraction, the improvement comprising contacting the said hydrocarbon with a metal glycinate derivative in the presence of an alkaline solution.

2. The process as claimed in claim 1 where the hydrocarbon oil is prewashed in an alkaline solution to remove the hydrogen sulfide in the said hydrocarbon oil.

3. The process as claimed in claim 1 where the said metal glycinate derivative is iron diethanol glycinate.

4. The process as claimed in claim 2 where the said metal glycinate derivative is lead diethanol glycinate.

5. The process as claimed in claim 2, a first step wherein the said metal glycinate derivative in the presence of the said alkaline solution extracts the said mercaptan sulfur from the hydrocarbon oil by reacting with the said mercaptan sulfur to form a metal glycinate mercaptide substantially soluble in the said alkaline solution; a second step wherein the said metal glycinate mercaptide is oxidized in the presence of an oxygen containing gas to substantially regenerate the said metal glycinate mercaptide in the said alkaline solution to form sulfur disulfide and a metal glycinate in the said alkaline solution; a third step of scrubbing the said regenerated metal glycinate and the sulfur disulfides in the said alkaline solution with naphtha to separate the said sulfur disulfides from the regenerated metal glycinate in the said alkaline solution, the said disulfides in the said naphtha being removed for further processing, the said regenerated metal glycinate in the said alkaline solution being recirculated for the removal of mercaptan sulfur from hydrocarbon oil.

6. The process as described in claim 5 where the said mercaptan sulfur in the hydrocarbon oil is extracted at ambient temperature.

7. The process as claimed in claim 5 where the said metal glycinate derivative is iron diethanol glycinate.

8. The process as claimed in claim 5 where the said metal glycinate derivative is lead diethanol glycinate.

9. The process as claimed in claim 5 where the said metal glycinate derivative is cobalt diethanol glycinate.

References Cited

UNITED STATES PATENTS

| 2,348,623 | 5/1944 | Hewlett et al. | 208—20 |
| 2,853,432 | 9/1958 | Gleim et al. | 208—244 |

DELBERT E. GANTZ, Primary Examiner

J. M. NELSON, Assistant Examiner

U.S. Cl. X.R.

208—229 R, 249 R